United States Patent
Hu et al.

(10) Patent No.: US 10,298,014 B2
(45) Date of Patent: May 21, 2019

(54) SYSTEM AND METHOD FOR CONTROLLING SOLID STATE LAMPS

(71) Applicants: Dialog Semiconductor (UK) Limited, London (GB); Dialog Semiconductor Inc., Campbell, CA (US)

(72) Inventors: Ye Hu, Guangdong (CN); Baorong Chen, Guangdong (CN); Liang Yan, Shanghai (CN)

(73) Assignees: Dialog Semiconductor (UK) Limited, London (GB); Dialog Semiconductor, Inc., Campbell, CA (US)

( * ) Notice: Subject to any disclaimer, the term of this patent is extended or adjusted under 35 U.S.C. 154(b) by 0 days.

(21) Appl. No.: 15/802,901

(22) Filed: Nov. 3, 2017

(65) Prior Publication Data

US 2018/0054056 A1    Feb. 22, 2018

Related U.S. Application Data

(63) Continuation of application No. PCT/CN2015/079948, filed on May 27, 2015.

(51) Int. Cl.
*H02J 3/18* (2006.01)
*H05B 33/08* (2006.01)

(52) U.S. Cl.
CPC .............. *H02J 3/18* (2013.01); *H02J 3/1821* (2013.01); *H05B 33/0815* (2013.01); *Y02B 20/346* (2013.01); *Y02B 20/383* (2013.01)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS 7,148,632 B2    12/2006  Berman et al.
7,928,856 B2     4/2011  Jacubovski et al.
(Continued)

FOREIGN PATENT DOCUMENTS

CN    101682972    3/2010
CN    102395233    3/2012
CN    103826359    5/2014

OTHER PUBLICATIONS

PCT Search Report, Application No. PCT/CN2015/079948, Applicant: Dialog Semiconductor (UK) Limited et al., dated Mar. 4, 2016, 3 pgs.
(Continued)

*Primary Examiner* — Minh D A
(74) *Attorney, Agent, or Firm* — Saile Ackerman LLC; Stephen B. Ackerman

(57) ABSTRACT

A solid state driver circuit that is compatible with either a low frequency mains or magnetic ballast supply or a high frequency electronic ballast input is presented. An input detection circuit detects the frequency of the supply and selectively adjusts the drive circuit to act as a linear regulator when an electronic ballast is detected, or as a switched mode regulator when mains or a magnetic ballast is detected. There is also provided a method of driving a solid state lamp. The method has a step which receives an input power supply. The method also has an enabling operation of a switching regulator or the shorting of a switching regulator according to the frequency of the input power supply.

14 Claims, 5 Drawing Sheets

(58) Field of Classification Search
CPC .............. H05B 37/029; H05B 37/0254; H05B 33/0827; H05B 37/02; H05B 33/0803; H05B 41/28; H05B 41/42; H05B 33/0851; F21Y 2101/02; F21W 2131/406; G05B 19/14

See application file for complete search history.

(56) References Cited

U.S. PATENT DOCUMENTS

| | | |
|---|---|---|
| 2004/0135522 A1 | 7/2004 | Berman et al. |
| 2009/0021384 A1 | 1/2009 | Jacubovski et al. |
| 2010/0231136 A1* | 9/2010 | Reisenauer et al. ... H02B 37/02 |
| 2011/0304276 A1 | 12/2011 | Hariharan |
| 2013/0278145 A1* | 10/2013 | Lin et al. ............... H05B 33/08 |
| 2014/0139107 A1 | 5/2014 | Hariharan |
| 2014/0346874 A1* | 11/2014 | Fang et al. ........ H02M 3/33523 |
| 2015/0002109 A1* | 1/2015 | Bianco .................. H05B 33/08 |
| 2015/0022109 A1* | 1/2015 | Lee et al. ........... H05B 33/0803 |

OTHER PUBLICATIONS

PCT Written Opinion, International Application No. PCT/CN2015/079948, Applicant: Dialog Semiconductor (UK) Limited, et al., dated Mar. 4, 2016, 4 pgs.

Chinese Office Action, File No. PCT/CN2015/079948, Assignee: Dialog Semiconductor (UK) Limited and Dialog Semiconductor Inc., dated Jan. 3, 2019, 6 pages, and a Concise Explanation of Relevance for Non-English Language Information, 2 pages.

* cited by examiner

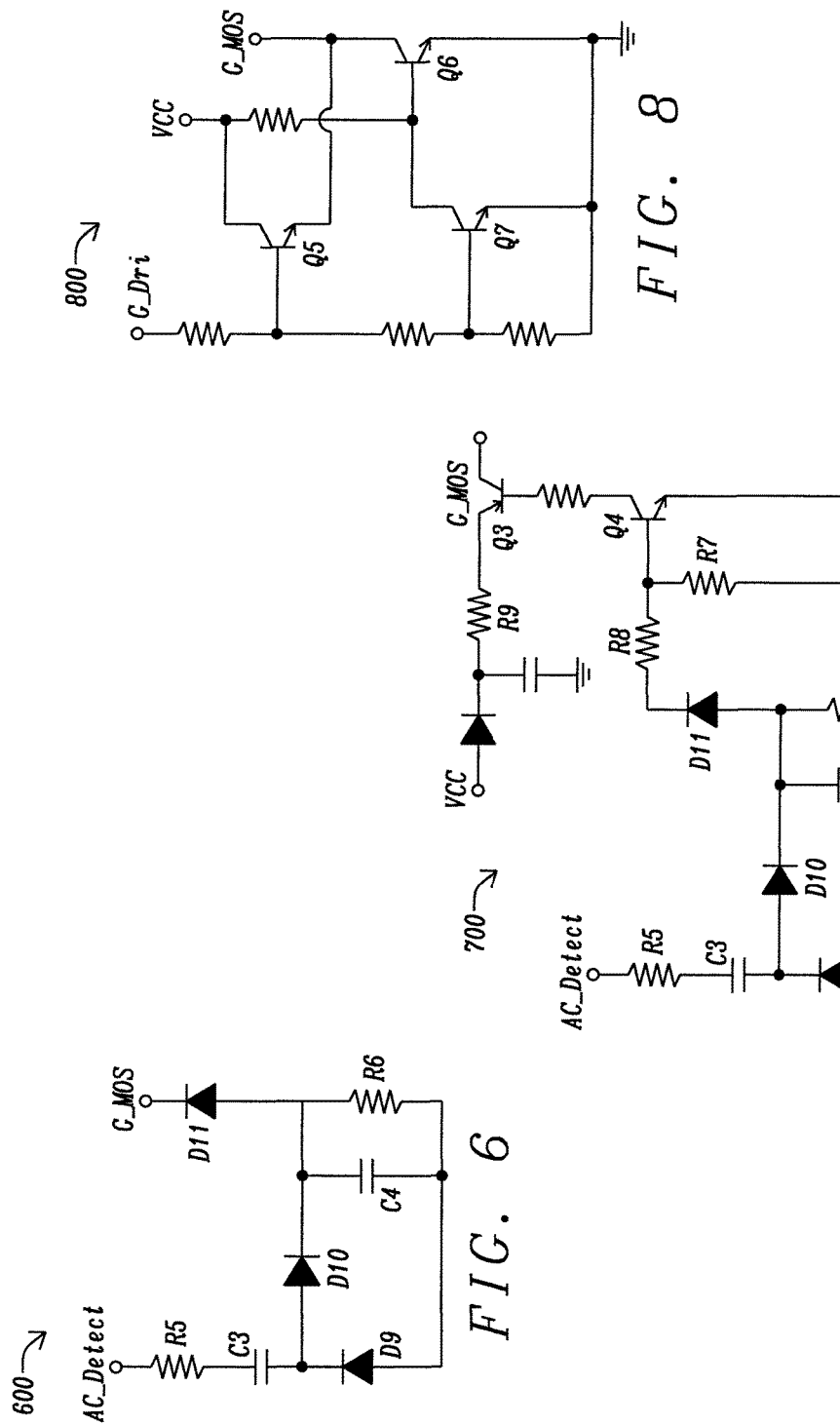

SYSTEM AND METHOD FOR CONTROLLING SOLID STATE LAMPS

This application is a Continuation of: PCT application number PCT/CN2015/079948, Filed May 27, 2015, which is owned by common assignees and is herein incorporated by reference in its entirety.

TECHNICAL FIELD

The present disclosure relates to a system and a corresponding method for controlling solid state lamps.

BACKGROUND

Solid-state lamps are replacing fluorescent and incandescent lamps due to their superior efficiency. The lighting element in a solid state lamp comprises semiconductor material where light is emitted by electroluminescence. Various types of lighting element may be employed such as light emitting diodes (LEDs) of various types (including silicon, organic and polymer LEDs). The present disclosure will discuss in particular the case of an LED but it will be appreciated that it applies in general to other types of solid-state lamps.

The current through a solid state lighting element needs to be controlled to ensure that a minimum amount of power is provided so that light of the required brightness is emitted, but also that a maximum amount of power is not exceeded in order to prevent damage to the element and the circuit. To take care of this, an LED driver circuit is provided.

Ballasts are also often used in lighting systems. A ballast is a device or circuit which limits the amount of current supplied to a load. They are commonly used in devices which exhibit a negative resistance characteristic such as gas discharge lamps, where limiting the current is important to prevent the lamp being destroyed or failing. However, ballasts are also useful for limiting the current in ordinary positive resistance circuits, including for use with solid state lamps. The ballast is usually integrated with a luminaire housing, for coupling with the driver circuit of a solid state lamp via suitable electrical connectors when the solid state lamp is inserted into a socket of a luminaire housing.

FIG. 1 illustrates an LED lighting system 100 where an LED driver circuit comprises a linear regulator 102, which supplies power to a series of LEDs 104 shown generally as LED1 through LEDn. The linear regulator 102 is coupled with the mains supply 106 provided by an electrical grid (or alternatively by an off grid power supply). A linear regulator can be connected to a mains AC supply, but has a low efficiency and high power loss, leading to high heat dissipation. When connected to a ballast, the linear regulation needs to be adjusted in order to balance the input and output power of the LED driver circuit.

FIG. 2 illustrates a lighting system 200 in which a switching regulator 202 is used to control the power supplied to the LEDs 104. The switching regulator has a switching element that acts to selectively charge or discharge an energy storage element and to selectively couple the energy storage element with the load, to regulate voltage or current characteristics and control the power supplied to the load. Various different circuit topologies are known, including without limitation a buck converter, a boost converter, a buck-boost, and a single ended primary inductor converter (SEPIC). A switching regulator 202 is more energy efficient than a linear regulator.

A switching regulator 202 works well with an AC mains power supply or with a magnetic ballast, which operates at a similar frequency. However, when directly connected to an electronic ballast, the switching regulator 202 can cause flickering, incorrect output voltage and current, unstable and unreliable operation, or even damage to the circuit. This is because switching regulators are designed to work with an AC input or a magnetic ballast, both of which are voltage sources. However, an electronic ballast acts as a current source and so when connected to a ballast the input energy and further the input voltage of the switching regulator 202 depends on its output part. If there is any mismatch between the input power and the output power, the switching regulator 202 will see either insufficient input voltage or excessive input voltage.

Therefore it can be understood that existing LED driver circuits are designed to be used either exclusively with a mains supply or with an electronic ballast. If an LED driver circuit is designed for use with a mains supply it will not function properly with a ballast, and vice versa.

This creates a problem for lamp interoperability, and for retrofitting of lamps. A solid state lamp is usually provided in a bulb housing and includes the driver circuit and the light emitting element. A lighting system may comprise a luminaire which has a housing and a socket for receiving a lamp. A ballast will normally be provided as part of the luminaire for electrical connection with a lamp which is inserted, via appropriate mating electrical connectors provided by the bulb housing and the luminaire socket.

A major concern with installing and maintaining lighting installations is interoperability of lamps with different types of ballasts. A luminaire may or may not have a ballast fitted, and the driver circuit of a solid state lamp may or may not be compatible with a ballast. So this means the compatibility of the lamps and light fixtures must be checked carefully. This increases inconvenience for users, and introduces complexity for manufacturers who must manufacture, administer and support multiple different products to account for the various combinations that are possible.

SUMMARY

It would be highly advantageous if a solid state lamp driver circuit could function when coupled with either a ballast or an AC supply as its input. According to a first aspect of the disclosure there is provided a solid state lamp driver circuit comprising: a switching regulator; an input detector arranged to receive an input power supply and output a control signal which depends on a frequency of the input power supply; and a control device arranged to receive the control signal and to enable operation of the switching regulator or to short the switching regulator according to the control signal.

Optionally, the control device is arranged to enable operation of the switching regulator if the control signal indicates that a frequency within a first range is detected, and is arranged to short the switching regulator if the control signal indicates that a frequency within a second range is detected, wherein the first range is lower than and non-overlapping with the second range.

Optionally, the control signal comprises a first logic state if a frequency within the first range is detected, and a second logic state if a frequency within the second range is detected.

Optionally, the first frequency range corresponds to an operating range of a mains supply and/or a magnetic ballast and the second frequency range corresponds to an operating range of an electronic ballast.

Optionally, the switching regulator comprises a buck converter.

Optionally, when shorted, the buck converter provides a DC path and the driver circuit functions as a linear regulator.

According to a second aspect of the disclosure there is provided a method of driving a solid state lamp comprising: receiving an input power supply; and enabling operation of a switching regulator or shorting a switching regulator according to the frequency of the input power supply.

Optionally, the method comprises outputting a control signal based on the frequency of the input power supply and enabling operation of a switching regulator or shorting a switching regulator according to the control signal.

Optionally, the control signal comprises a first logic state if a frequency within the first range is detected, and a second logic state if a frequency within the second range is detected.

Optionally, the method comprises: enabling operation of the switching regulator if a frequency of the input power supply is within a first range; shorting the operation of the switching regulator if a frequency of the input power supply is within a second range; wherein the first range is lower than and non-overlapping with the second range.

Optionally, the first frequency range corresponds to an operating range of a mains supply and/or a magnetic ballast and the second frequency range corresponds to an operating range of an electronic ballast.

Optionally, the switching regulator comprises a buck converter.

Optionally, when shorted, the buck converter provides a DC path and the driver circuit functions as a linear regulator.

According to a third aspect of the disclosure there is provided a lighting system comprising: one or more solid state lamps; and a driver circuit for driving one or more of said solid state lamps; said lamp driver circuit comprising: a switching regulator; an input detector arranged to receive an input power supply and output a control signal which depends on a frequency of the input power supply; and a control device arranged to receive the control signal and to enable operation of the switching regulator or to short the switching regulator according to the control signal.

The third aspect may incorporate any combination of features of the first and second aspects.

BRIEF DESCRIPTION OF THE DRAWINGS

The present disclosure will now be described, by way of example only, with reference to the accompanying drawings in which:

FIG. 6 illustrates a first example input detection circuit, for use with the lighting circuit of FIG. 4;

FIG. 7 illustrates a second example input detection circuit, for use with the lighting circuit of FIG. 5; and FIG. 8 illustrates a third example input detection circuit, for use with the lighting circuit of FIG. 5.

DESCRIPTION

According to the disclosure a lighting system comprises a solid state lamp and a driver circuit for controlling the power input to the solid state lamp. The driver circuit comprises a switching regulator (for example a buck converter), an input detection circuit and a control device. The input detection circuit monitors the power supply that is input to the driver circuit and outputs a control signal based on the detected frequency. The control device then acts on the control signal to either enable the switching regulator or to short circuit it. When the switching regulator is short circuited, the driver circuit acts as a linear regulator. When the input to the driver circuit is provided directly by a mains supply, or by a magnetic ballast, then the input detection circuit will determine that the input has a relatively low frequency and will enable the switching regulator. However, when the input to the driver circuit is provided directly by an electronic ballast, then the input detection circuit will determine that the input has a relatively high frequency and will short the switching regulator. A solid state lamp that incorporates such a driver circuit can therefore operate with any of a mains supply, a magnetic ballast or an electronic ballast, and will change its operation accordingly to ensure correct operation.

Mains supply varies in frequency from country to country but for the present disclosure we assume it is between 50 and 60 Hz. For the avoidance of doubt, other mains supplies are not excluded the present disclosure.

Ballasts are used in various contexts to limit and control the current through electrical loads. There are two main types of ballast: magnetic and electronic. Magnetic ballasts include inductors which provide reactance to the electrical current provided to a circuit. They operate at a frequency that is synchronised with the mains frequency. Electronic ballasts employ solid state circuits and are often based on switched mode power supply topology, rectifying the input power and chopping it at high frequency. An electronic ballast may allow dimming by techniques such as pulse width modulation. An electronic ballast usually supplies power to a lamp at frequencies of several tens of kilohertz, commonly 50 kHz or higher. While there can be some variation between specific frequencies of mains supplies, magnetic ballasts and electronic ballasts, the frequency of an electronic ballast will always be an order or magnitude (or more) higher than that of the mains supply or of a magnetic ballast.

Figure 1:
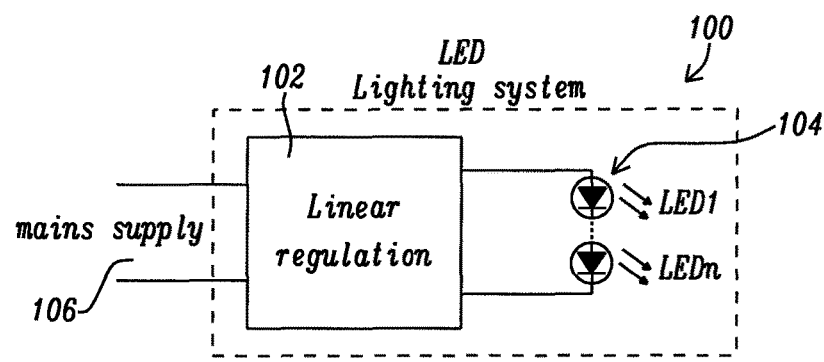
FIG. 1 shows a first existing LED lighting system with a drive circuit including a linear regulator.
Figure 2:
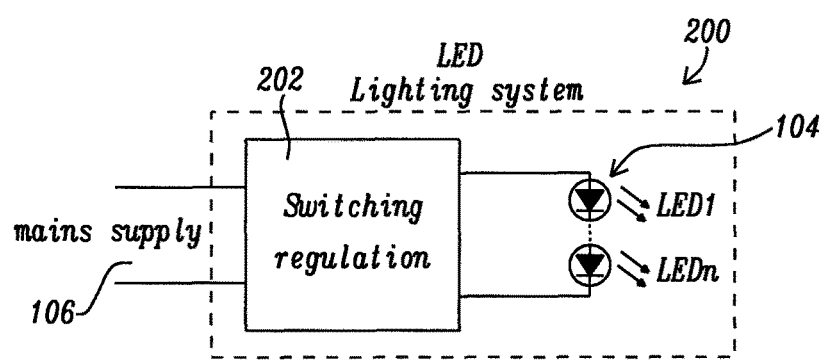
FIG. 2 to the second existing LED lighting system with a drive circuit including a switching regulator.
Figure 3:
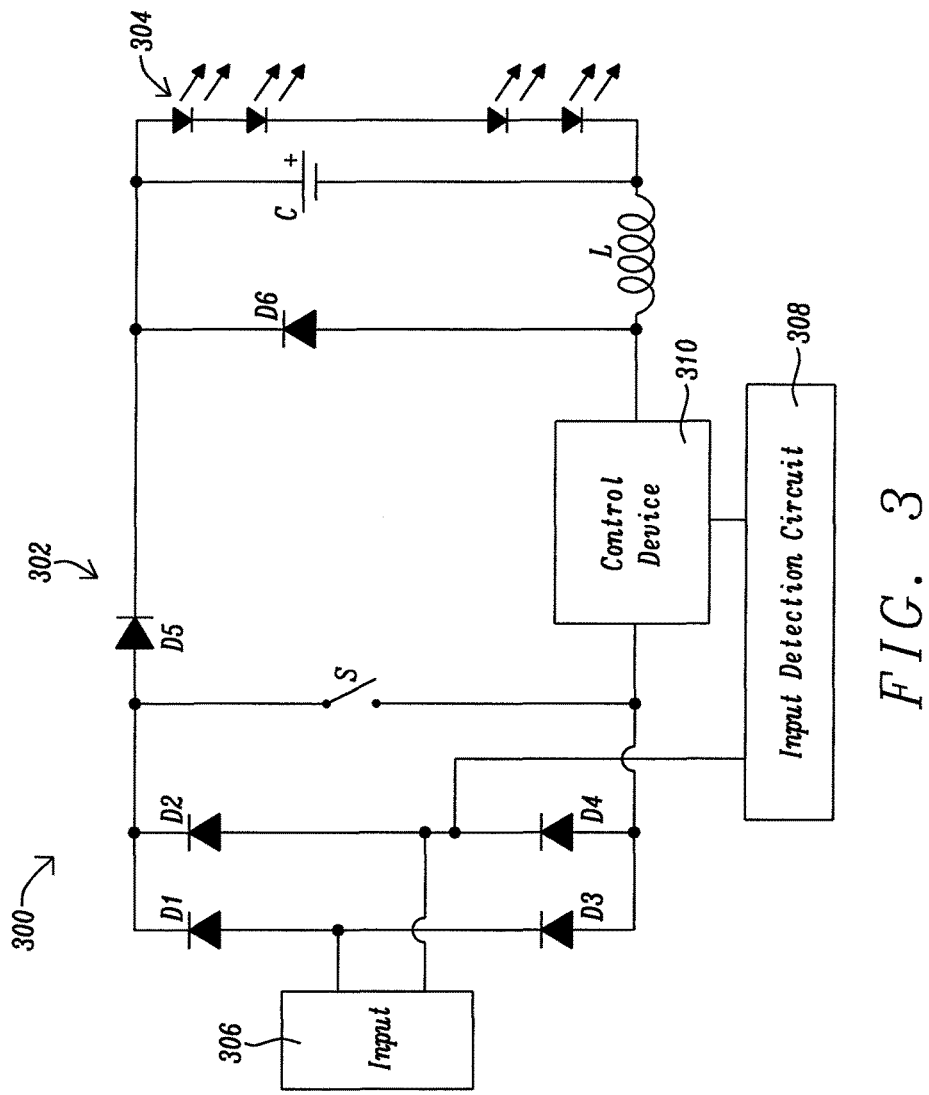
FIG. 3 illustrates a lighting circuit according to a first embodiment of the disclosure.

FIG. 3 illustrates a lighting system 300 according to a first embodiment of the disclosure. A driver circuit 302 is provided between input 306 and a series of LED lamps 304 which form the load for the driver circuit 302. Any number of light emitting elements may be provided. Diodes D1 to D4 act to rectify the input and diode D5 is a blocking diode which prevents current flowing back from the load to the input. An inductor (L) and freewheeling diode (D6) are also provided. The switch S provides overvoltage protection and is used to selectively decouple the input from the output. The driver circuit 302 comprises an input detection circuit 308 and a control device 310.

The input detection circuit 308 detects whether the frequency of the input 306 is low or high. In a preferred embodiment, a low frequency is defined as being in a range of frequencies that may be supplied by a mains supply or a magnetic ballast, and a high frequency is defined as being in a range of frequencies that may be supplied by an electronic ballast. The low frequency range may include frequencies of the order of 100 Hz and the high frequency range may include frequencies of the order of 10 kHz.

The control device 310 operates to control the power provided to the load. The control device 310 may be switched between different modes depending upon the output of the input detection circuit 308, which may in a preferred embodiment comprise high or low logic signals being representative of whether a high or low input frequency is detected. It is possible for more sophisticated outputs to be provided in alternative embodiments, including quantifications of the actual detected frequency for more sophisticated control.

When it is detected that the input is an electronic ballast, the control device 310 short circuits the switching regulator. In this case, the driver circuit operates as a linear regulator. When it is detected that the input is a mains supply or a magnetic ballast, the control device 310 enables the switching regulator so that normal switched mode regulation can be used.

Figure 4:
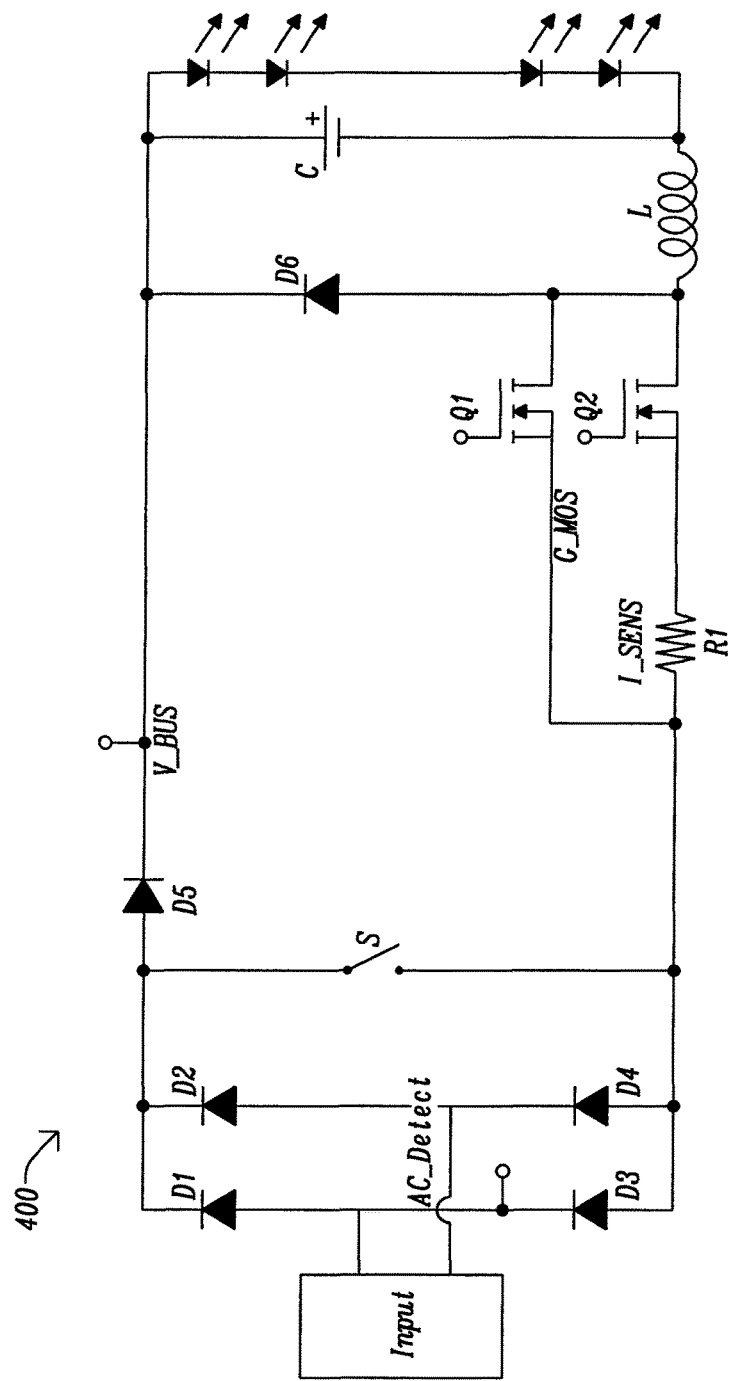
FIG. 4 illustrates part of a lighting circuit according to an aspect of the disclosure, wherein a control device is provided with two switching elements.

The control device in one aspect comprises two switching elements, one of which is activated for enabling the switching regulator, and the other of which is activated for shorting the switching regulator and providing a linear regulator. An example embodiment of such an aspect is shown in FIG. 4. Here, a lighting circuit 400 comprises a control device with two switches, Q1 and Q2. Q1 is used for a switching function and Q2 is used for a short circuit function. The input detection circuit is not shown here (and will be discussed below), but it receives an input from the AC_DETECT node and provides a control signal G_MOS to the gate of Q2. Q1 is controlled by another switching regulator.

When the input signal is provided by a mains supply or a magnetic ballast, the input signal detection circuit outputs a low signal level to the gate of Q2. The circuit works in buck mode, with the switch Q1, the inductor (L) and diode (D6) forming a buck converter circuit. Q1 operates in a high-frequency switch state and Q2 remains off. When the input signal is derived from an electronic ballast, the input detection circuit outputs a high level signal. Q1 is controlled and kept in the off state. Q2 remains on, and the resistor R1, inductor L and output capacitor C act as a linear regulator. This circuit takes advantage of the fact that a buck converter can form a DC path when it is shorted.

Figure 5:
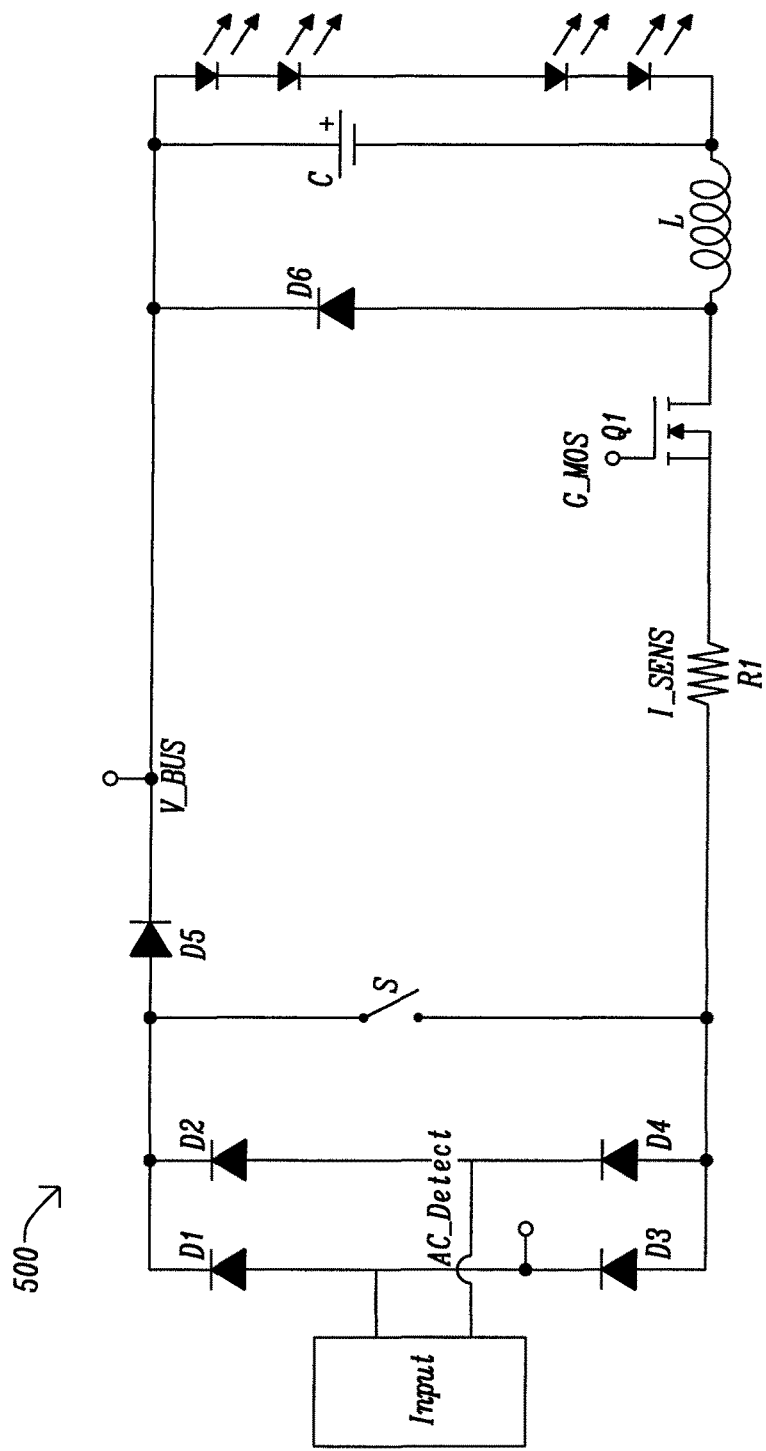
FIG. 5 part of a lighting circuit according to an aspect of the disclosure, wherein a control device is provided with one switching elements.

According to another aspect, the control device may comprise a single switching element which changes operational states to either function as part of a switched regulator, or to remain in a state whereby the switched regulator is shorted and the driver circuit acts as a linear regulator. An example embodiment of such an aspect is shown in FIG. 5. Here, a lighting circuit 500 comprises a control device comprising a switching element Q1. The input detection circuit is not shown here (and will be discussed below), but it receives an input from the AC_DETECT node and provides a control signal G_MOS to the gate of Q1.

When the input signal is provided from a mains supply or a magnetic ballast the input detection circuit outputs a low level signal to G_MOS. The gate of Q1 is then controlled by G_MOS which may be a regulated pulse width modulated signal to operation of the buck circuit. When the input signal is from an electronic ballast, the input detection circuit outputs a high level signal. Q1 is kept on, effectively short circuiting the buck circuit. The resistor R1, inductor L and output capacitor C act as a linear regulator. Again, this circuit takes advantage of the fact that a buck converter can form a DC path when it is shorted.

Any suitable frequency discrimination or detection circuit may be used for the input detection circuit 308. FIG. 6 shows one suitable example, which is suitable for use with the two-switch control device of FIG. 4 or FIG. 5.

Here, a low frequency AC signal is blocked but a high frequency AC signal is passed. The input source voltage is divided by C3, C4, and R5. When the frequency is low (mains or magnetic ballast), the voltage of C4 is lower than 0.7V; when the frequency is high (electronic ballast), the voltage of C4 is about 10V.

When the input signal is the AC mains supply or a magnetic ballast, the input detection circuit 600 of FIG. 6 outputs a low level signal to the terminal G_DRI which enables the buck of FIG. 4 as mentioned above. When the input signal is from an electronic ballast the input detection circuit 600 outputs a high level signal, the switch Q2 of FIG. 4 remains on and in short-circuit mode. Q1 is controlled and kept in an off state.

FIG. 7 shows another embodiment of an input detection circuit 700. This may be used together with the circuit of FIG. 4 or FIG. 5.

FIG. 8 shows another embodiment of an input detection circuit 800. This may be used together with the circuit of FIG. 4 or FIG. 5. The drive signal G_Dri is obtained from a switching regulator integrated circuit, so when the VCC of the IC is low, the Gate is pulled to ground to protect the main circuit. If G_Dri is high level, G_MOS is high, but when VCC is low, and if G_Dri is low, then G_MOS is not controlled.

The circuit of FIG. 8 shows a means by which Q1 will be kept in a normal closed state in the meantime the buck control circuit can be disabled but this is not a requirement.

Various improvements and modifications can be to the above the scope of the disclosure.

What is claimed is:

1. A solid state lamp driver circuit comprising:
   a switching regulator;
   an input detector arranged to receive an input power supply and output a control signal which depends on a frequency of the input power supply; and
   a control device arranged to receive the control signal and to enable operation of the switching regulator or to short the switching regulator according to the control signal.

2. The solid state lamp driver circuit of claim 1, wherein the control device is arranged to enable operation of the switching regulator if the control signal indicates that a frequency within a first range is detected, and is arranged to short the switching regulator if the control signal indicates that a frequency within a second range is detected, wherein the first range is lower than and non-overlapping with the second range.

3. The solid state lamp driver circuit of claim 2, wherein the control signal comprises a first logic state if a frequency within the first range is detected, and a second logic state if a frequency within the second range is detected.

4. The solid state lamp driver circuit of claim 2, wherein the first frequency range corresponds to an operating range of a mains supply and/or a magnetic ballast and the second frequency range corresponds to an operating range of an electronic ballast.

5. The solid state lamp driver circuit of claim 1, wherein the switching regulator comprises a buck converter.

6. The solid state lamp driver circuit of claim 5, wherein, when shorted, the buck converter provides a DC path and the driver circuit functions as a linear regulator.

7. A method of driving a solid state lamp comprising the steps of:
   receiving an input power supply; and
   enabling operation of a switching regulator or shorting a switching regulator according to the frequency of the input power supply.

8. The method of claim 7, comprising outputting a control signal based on the frequency of the input power supply and enabling operation of a switching regulator or shorting a switching regulator according to the control signal.

9. The method of claim 8, wherein the control signal comprises a first logic state if a frequency within the first range is detected, and a second logic state if a frequency within the second range is detected.

10. The method of claim 7, comprising the steps of:
    enabling operation of the switching regulator if a frequency of the input power supply is within a first range;
    shorting the operation of the switching regulator if a frequency of the input power supply is within a second range;
    wherein the first range is lower than and non-overlapping with the second range.

11. The method of claim 10, wherein the first frequency range corresponds to an operating range of a mains supply and/or a magnetic ballast and the second frequency range corresponds to an operating range of an electronic ballast.

12. The method of claim 7, wherein the switching regulator comprises a buck converter.

13. The method of claim 12, wherein, when shorted, the buck converter provides a DC path and the driver circuit functions as a linear regulator.

14. A lighting system comprising:
    one or more solid state lamps; and
       a driver circuit for driving one or more of said solid state lamps; said lamp driver circuit comprising:
       a switching regulator;
       an input detector arranged to receive an input power supply and output a control signal which depends on a frequency of the input power supply; and
    a control device arranged to receive the control signal and to enable operation of the switching regulator or to short the switching regulator according to the control signal.

* * * * *